April 3, 1956 — J. B. BROWN — 2,740,291
DEVICE FOR OBTAINING SAMPLES OF FORMATION
CUTTINGS ENTRAINED IN DRILLING FLUIDS
Filed Oct. 8, 1951 — 13 Sheets-Sheet 1

JOEL B. BROWN
INVENTOR.

BY
ATTORNEY

April 3, 1956 J. B. BROWN 2,740,291
DEVICE FOR OBTAINING SAMPLES OF FORMATION
CUTTINGS ENTRAINED IN DRILLING FLUIDS
Filed Oct. 8, 1951 13 Sheets-Sheet 3

INVENTOR.
JOEL B. BROWN
BY
ATTORNEY

April 3, 1956

J. B. BROWN 2,740,291

DEVICE FOR OBTAINING SAMPLES OF FORMATION
CUTTINGS ENTRAINED IN DRILLING FLUIDS

Filed Oct. 8, 1951

INVENTOR.
JOEL B. BROWN

BY
ATTORNEY

April 3, 1956 J. B. BROWN 2,740,291
DEVICE FOR OBTAINING SAMPLES OF FORMATION
CUTTINGS ENTRAINED IN DRILLING FLUIDS
Filed Oct. 8, 1951 13 Sheets-Sheet 6

Fig. 6

JOEL B. BROWN
INVENTOR.

ATTORNEY

April 3, 1956   J. B. BROWN   2,740,291
DEVICE FOR OBTAINING SAMPLES OF FORMATION
CUTTINGS ENTRAINED IN DRILLING FLUIDS
Filed Oct. 8, 1951   13 Sheets-Sheet 7
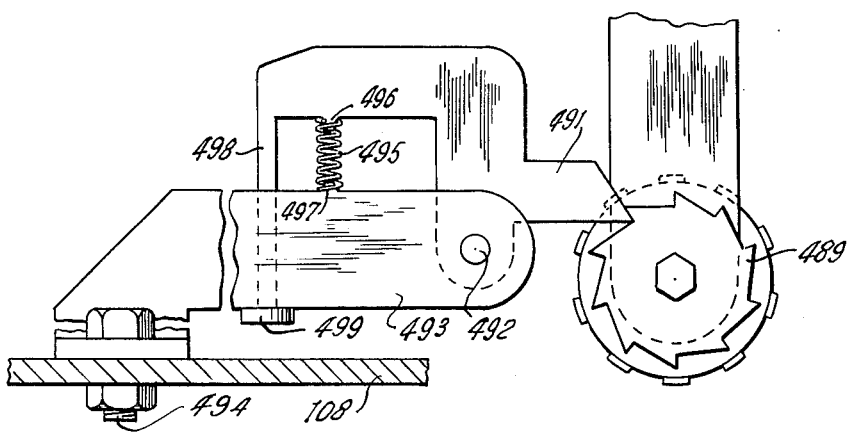
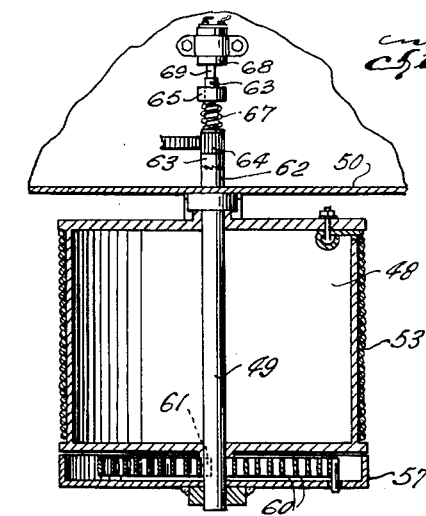
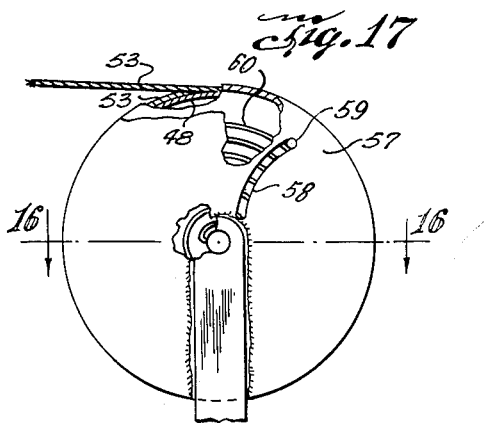
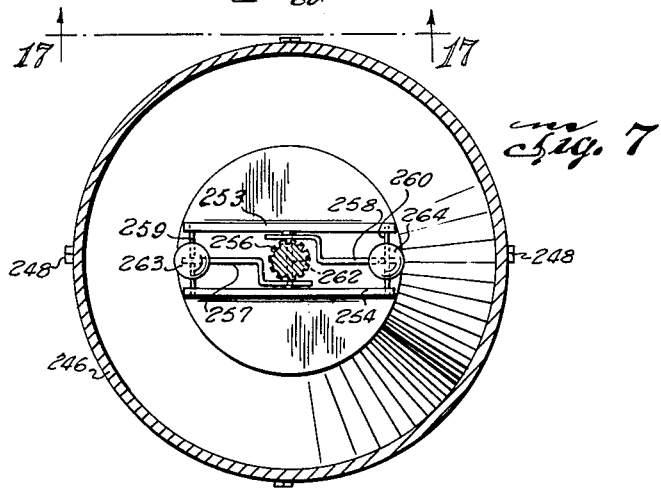
JOEL B. BROWN
INVENTOR.
ATTORNEY April 3, 1956
J. B. BROWN
2,740,291
DEVICE FOR OBTAINING SAMPLES OF FORMATION
CUTTINGS ENTRAINED IN DRILLING FLUIDS
Filed Oct. 8, 1951
13 Sheets-Sheet 8
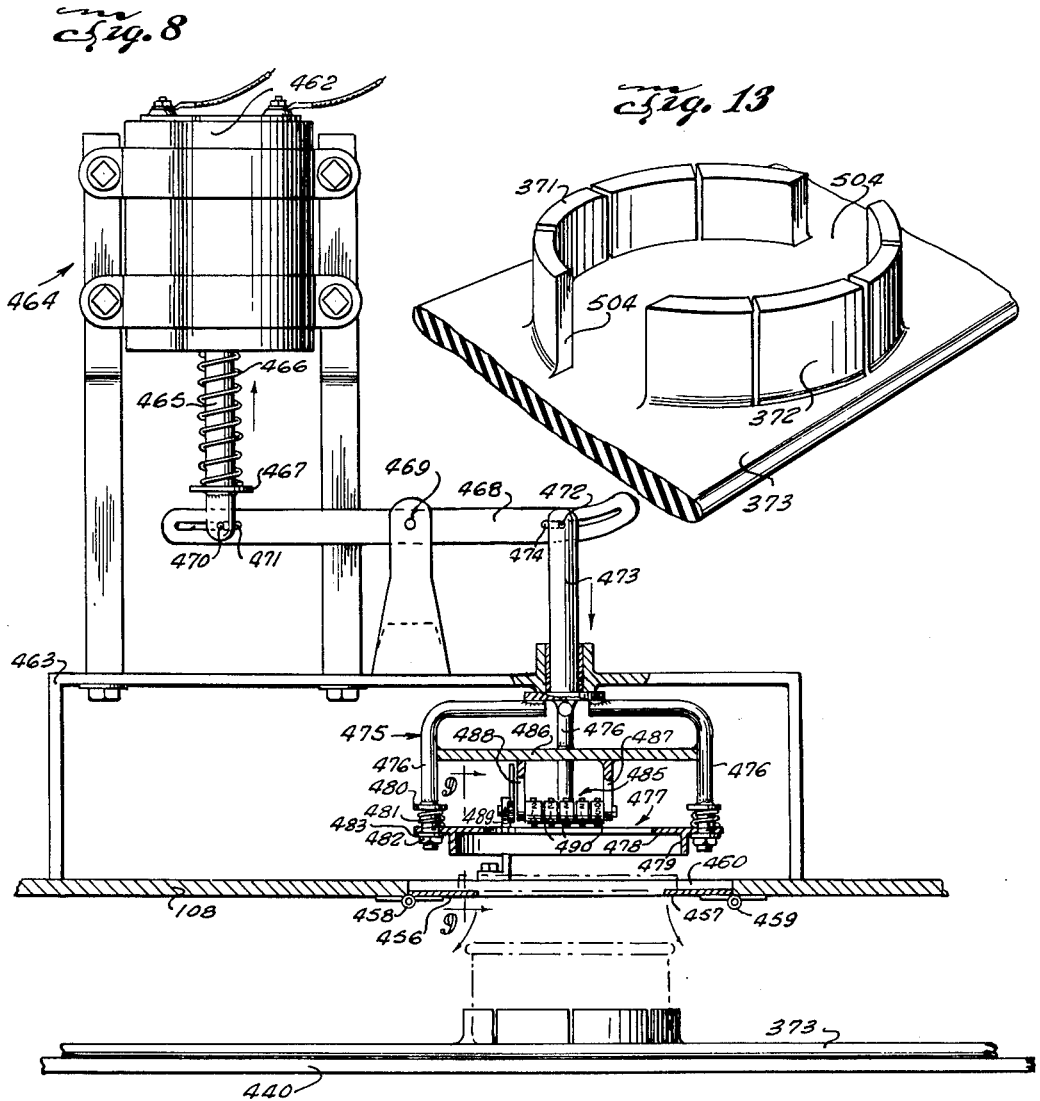
JOEL B. BROWN
INVENTOR.
ATTORNEY

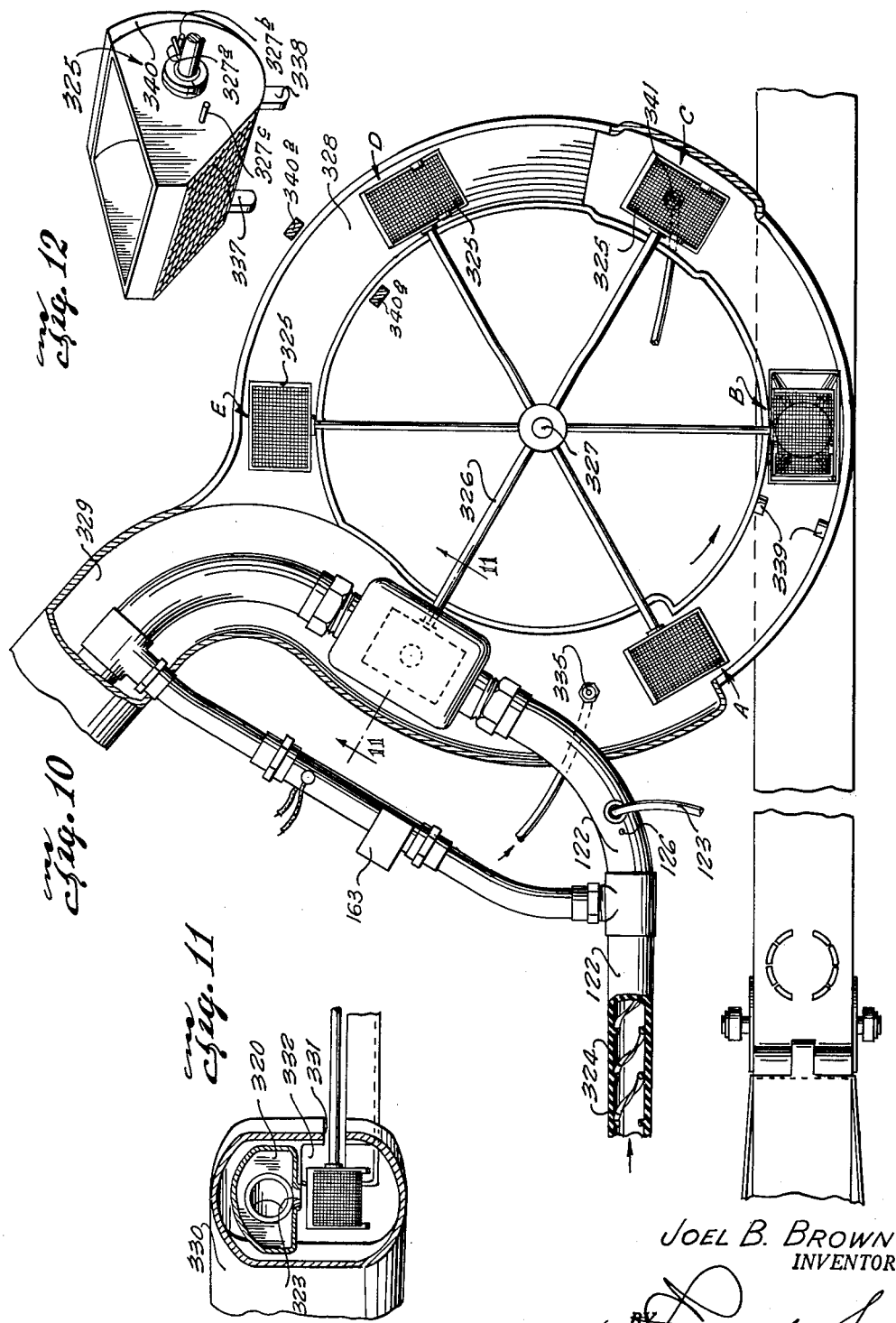

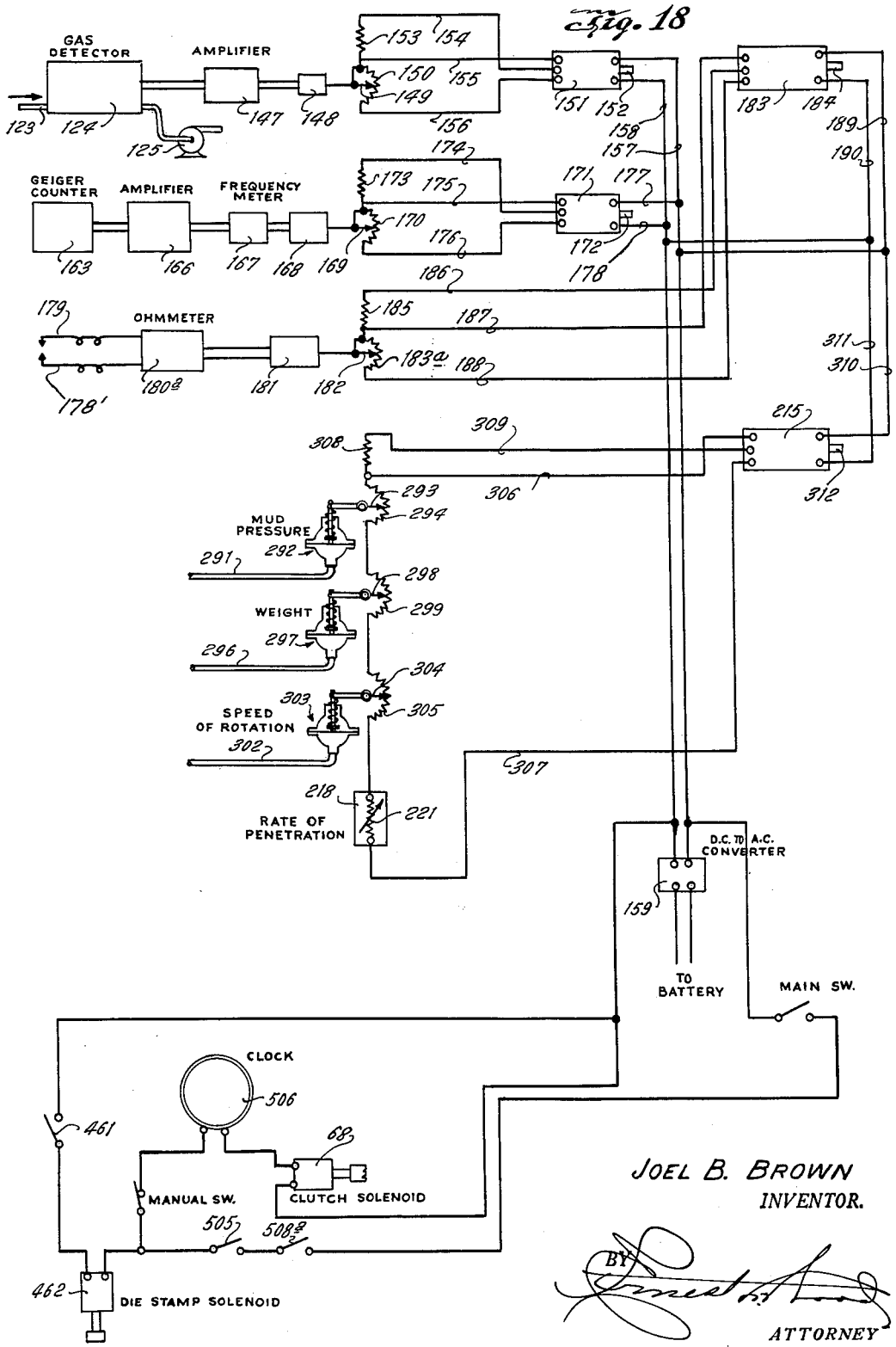

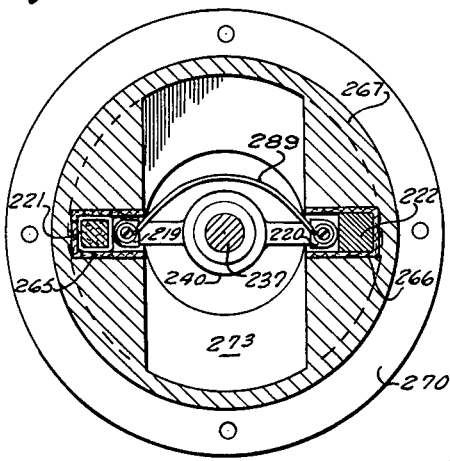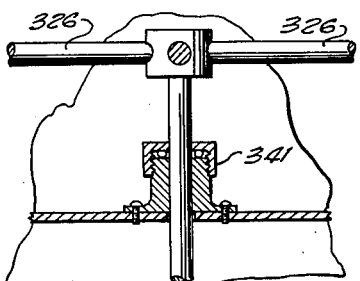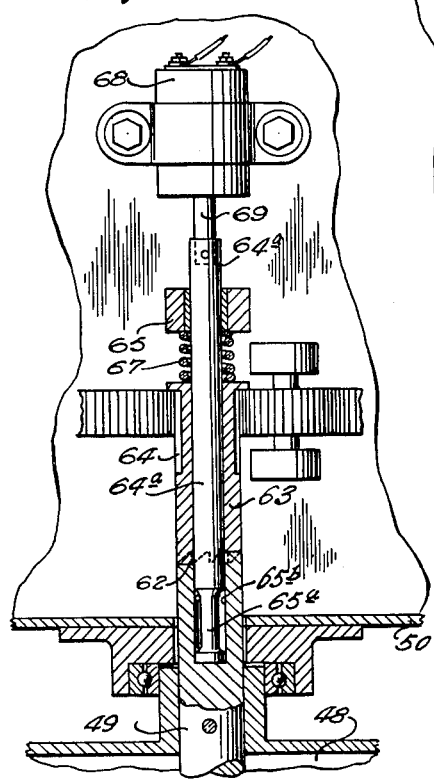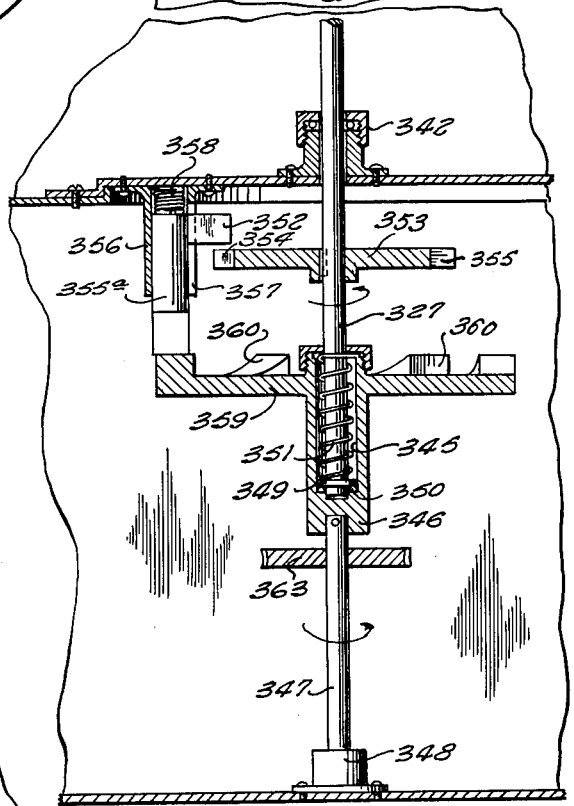

April 3, 1956     J. B. BROWN     2,740,291
DEVICE FOR OBTAINING SAMPLES OF FORMATION
CUTTINGS ENTRAINED IN DRILLING FLUIDS
Filed Oct. 8, 1951     13 Sheets-Sheet 12
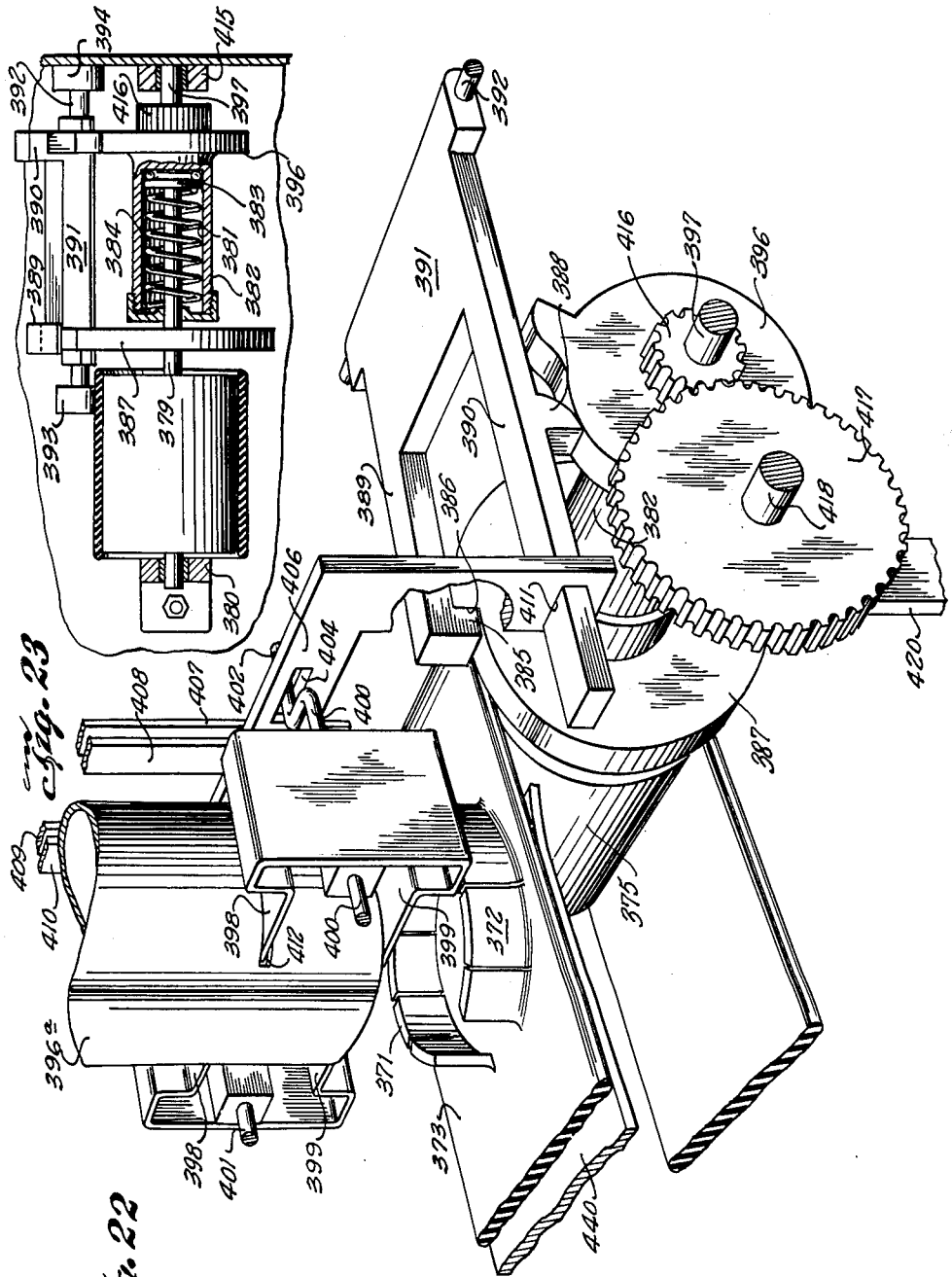
JOEL B. BROWN
INVENTOR.
ATTORNEY

JOEL B. BROWN
INVENTOR.

ATTORNEY

United States Patent Office 2,740,291
Patented Apr. 3, 1956

2,740,291

DEVICE FOR OBTAINING SAMPLES OF FORMATION CUTTINGS ENTRAINED IN DRILLING FLUIDS

Joel B. Brown, Shreveport, La., assignor to Addeco, Inc., Shreveport, La., a corporation of Louisiana Application October 8, 1951, Serial No. 250,363

9 Claims. (Cl. 73—153)

This invention relates to the art of drilling earth formations and more particularly to a sampling device operable in conjunction with a recorder for obtaining samples of the formations traversed.

In drilling earth formations, it is desirable to log or graphically record the resistivity, radio-activity, gas content and hardness of the earth formations traversed during the drilling operations in such manner that all characteristics can be simultaneously recorded and simultaneously compared to determine the type of formation found at any level of the earth formations traversed. It is also desirable to obtain identified samples of the earth formations traversed which can be studied and analyzed in laboratories remote from the drilling site. The recorder and sampling device should operate in synchronism in order that the samples from a given level of the well may be compared with the recorded characteristics of the earth formation at the given level. The recorder and sampling device should be automatic in operation in order to obviate the need of the constant presence of an attendant to operate them.

Accordingly, it is the principal object of the invention to provide a new and improved sampling device operatively associated with a recorder for obtaining samples of the formations traversed during the drilling operations of a well.

It is another object of the invention to provide a new and improved device for automatically obtaining samples of earth formations traversed in drilling operations.

It is still another object of the invention to provide a new and improved device for automatically obtaining washed and identified samples of earth formations traversed in drilling operations.

Briefly stated, the new and improved sampling device is connected to the Kelley block through the mechanical transmission and is driven in accordance with the descent of the drill to obtain samples from uniformly spaced levels of the traversed earth formations. The sampling device includes a plurality of buckets which are moved intermittently to a position beneath a discharge opening in a mud conduit through which mud flows from the well. Each bucket receives a load of mud mixed with pieces or cuttings of traversed earth formation broken by the drill in its passage therethrough. The bucket after being filled is first moved to a washing position where sprays of water wash out the mud and leave only the pieces of earth formation, then to a draining position where excess water drains off the pieces or sample of traversed earth formation, then to an unloading position where the bucket is overturned to discharge the sample into a container, then to a second washing position where any remaining pieces of earth formation are washed off, then to another draining position and finally back to the original position below the discharge opening in the mud conduit.

A container dispensing and conveying apparatus, also driven by the mechanical transmission, positions an empty container for the reception of a sample from a bucket and moves the loaded container to a capping position where a cap or lid is firmly placed on the container. The cap placing mechanism also stamps the cap to identify the depth from which the sample came. The capped containers are discharged to a storage area to await transportation to a laboratory.

For a better understanding of the invention, reference may be had to the following description taken in connection with the accompanying drawings and its scope will be pointed out in the appended claims.

In the drawings:

Figure 6 is a vertical sectional view of a device for controlling a rheostat in accordance with the speed of rotation of a shaft;

Figure 7 is a sectional view taken on line 7—7 of Figure 6;

Figure 8 is a partly sectional view of the cap stamping device;

Figure 9 is a sectional view taken on line 9—9 of Figure 8;

Figure 10 is an enlarged top view of the samping device with some parts broken away;

Figure 11 is a sectional view taken on the line 11—11 of Figure 10;

Figure 12 is a perspective of a bucket;

Figure 13 is a perspective view of a portion of the conveyor employed to move the containers;

Figure 14 is a perspective view of a container showing a cap in place;

Figure 15 is a vertical sectional view of a container;

Figure 16 is a side plan view taken on line 16—16 of Figure 17, with some parts broken away, of a cable drum forming a part of the mechanical transmission connecting the Kelley block to the recording and sampling device;

Figure 17 is a sectional view taken on line 17—17 of Figure 16;

Figure 18 is a schematic illustration of the recording and sampling device showing one form of an appropriate electrical circuit;

Figure 19 is a sectional view taken on the line 19—19 of Figure 6;

Figure 20 is a vertical sectional view of the means for intermittently moving the sampling buckets;

Figure 21 is a partly sectional view of a clutch assembly of the device;

Figure 22 is a fragmentary perspective view of a container dispensing device;

Figure 23 is a partly sectional view of a portion of the device shown in Figure 22;

Figure 1:
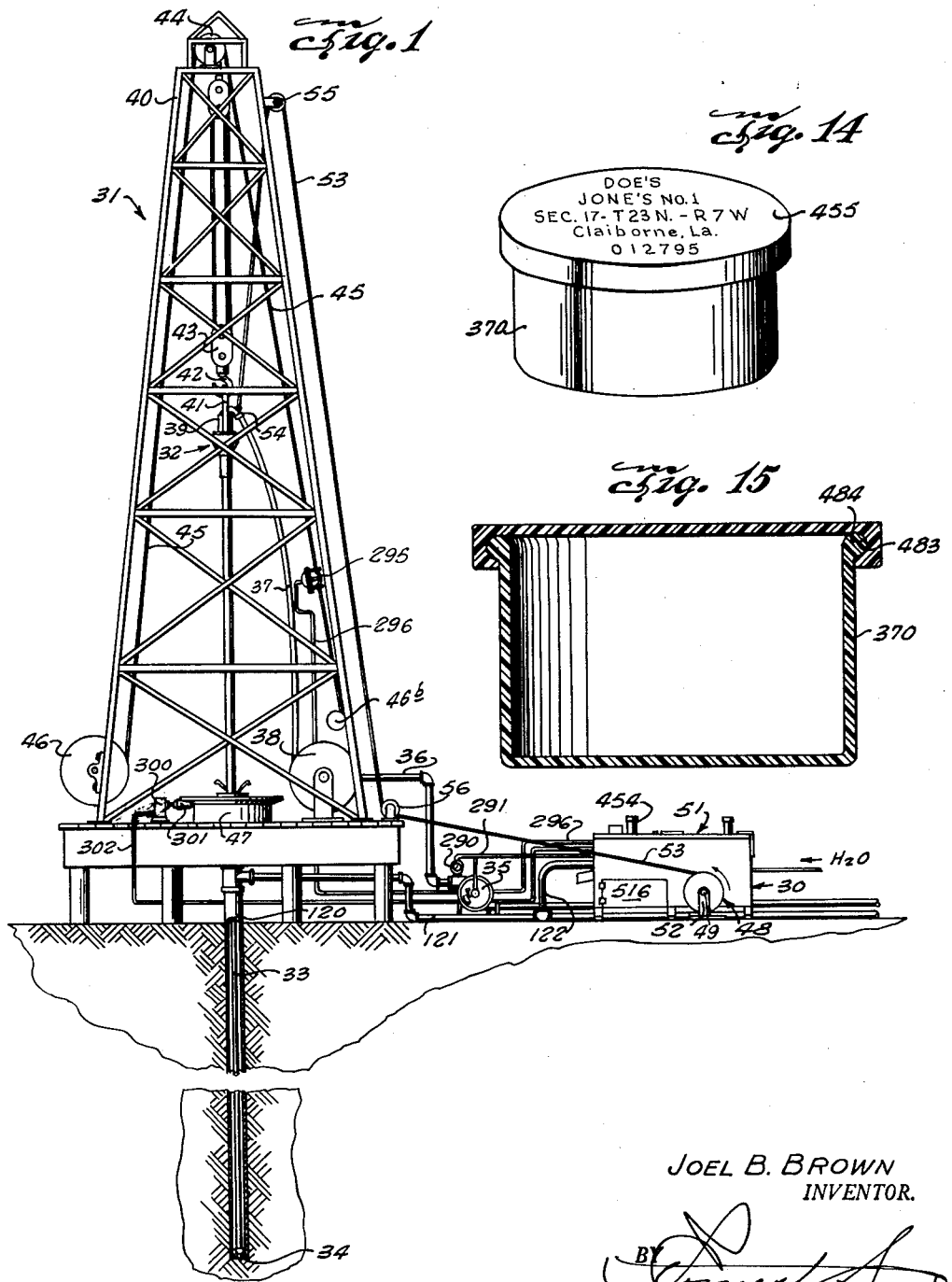
Figure 1 illustrates a preferred embodiment of the recording and sampling device as applied to a conventional rotary drilling rig.

Referring now especially to Figure 1 of the drawing, the recording and sampling device of the invention is generally indicated by reference numeral 30 shown as applied to a conventional rotary drilling rig 31 having a Kelley block 32 by means of which a conventional hollow drilling string 33 is lowered into a well bore. The drilling string is provided with the usual bit 34. The upper end of the drilling string is connected to the conventional drilling fluid or mud pump 35 through pipe 36, hose 37 which is moved about the conventional drum 38, and the swivel 39. The drilling string is suspended from the upper portion of the derrick 40 by means of the bail 41, hook 42, travelling block 43, crown block 44, and cable 45. One end of the cable 45 is wound upon the draw works drum 46 and the other end, known as the dead line, is anchored at 46b to a portion of the derrick structure. Mounted on the derrick floor is a rotary table 47 for rotating the drill string.

The recording and sampling device 30 includes a cable drum 48 (Fig. 1) rigidly mounted on a main shaft 49 journaled in one side 50 of the housing 51 of the device and in the upper end of a bracket 52. One end of a flexible member, such as cable 53, is secured to the drum 48 and its other end is secured to the goose neck 54 connecting the hose 37 to the drilling string. The cable 53 passes over direction changing pulleys 55 and 56 mounted on the derrick structure.

A housing 57 (Fig. 17) is rigidly secured to the bracket 52 at one end of the cable drum and is provided with an arcuate slot 58 through which extends a pin 59 rigidly secured to one end of a helical spring 60 whose other end 61 (Fig. 16) is rigidly secured to the main shaft 49. It will be apparent that as the drill string descends as the well is drilled, the cable 53 will unwind off the drum 48 causing the drum 48 and the main shaft 49 to rotate counter-clockwise, Figure 1, against the resistance of the spring 60. As the drum revolves counter-clockwise, the spring 60 will be wound tighter on itself and the main shaft 49, the pin 59 moving in the slot 58 toward the main shaft. If the drilling string is lifted, the spring 60 will rotate the drum 48 in a clockwise direction to again wind the cable on the drum.

The inner end of main shaft 49 is toothed as at 62 (Fig. 16) to engage the correspondingly toothed end of a clutch shaft 63. The clutch shaft is provided with a gear 64 intermediate its ends and is rigidly secured to a shaft 64a (Fig. 21) whose inner end is slidably and rotatably mounted in a pillow block 65 rigidly mounted on the bottom deck 66 (Fig. 3) of the housing 51. The outer end 65a of shaft 64a (Fig. 21) slides in a bore 65b in the main shaft 49. A biasing spring 67 disposed about the shaft 63 bears against the pillow block 65 and the clutch shaft 63 to bias the teeth of the clutch shaft 63 into engagement with the teeth of the main shaft 49. It will be apparent now that main shaft 49 may rotate in a clockwise direction without causing rotation of gear 64 since the clutch shaft may move inwardly against the resistance of the biasing spring 67.

A solenoid 68 has its plunger 69 secured to the clutch shaft 63 and is adapted to pull the clutch shaft out of engagement with the main shaft 49 when energized.

Figure 2:
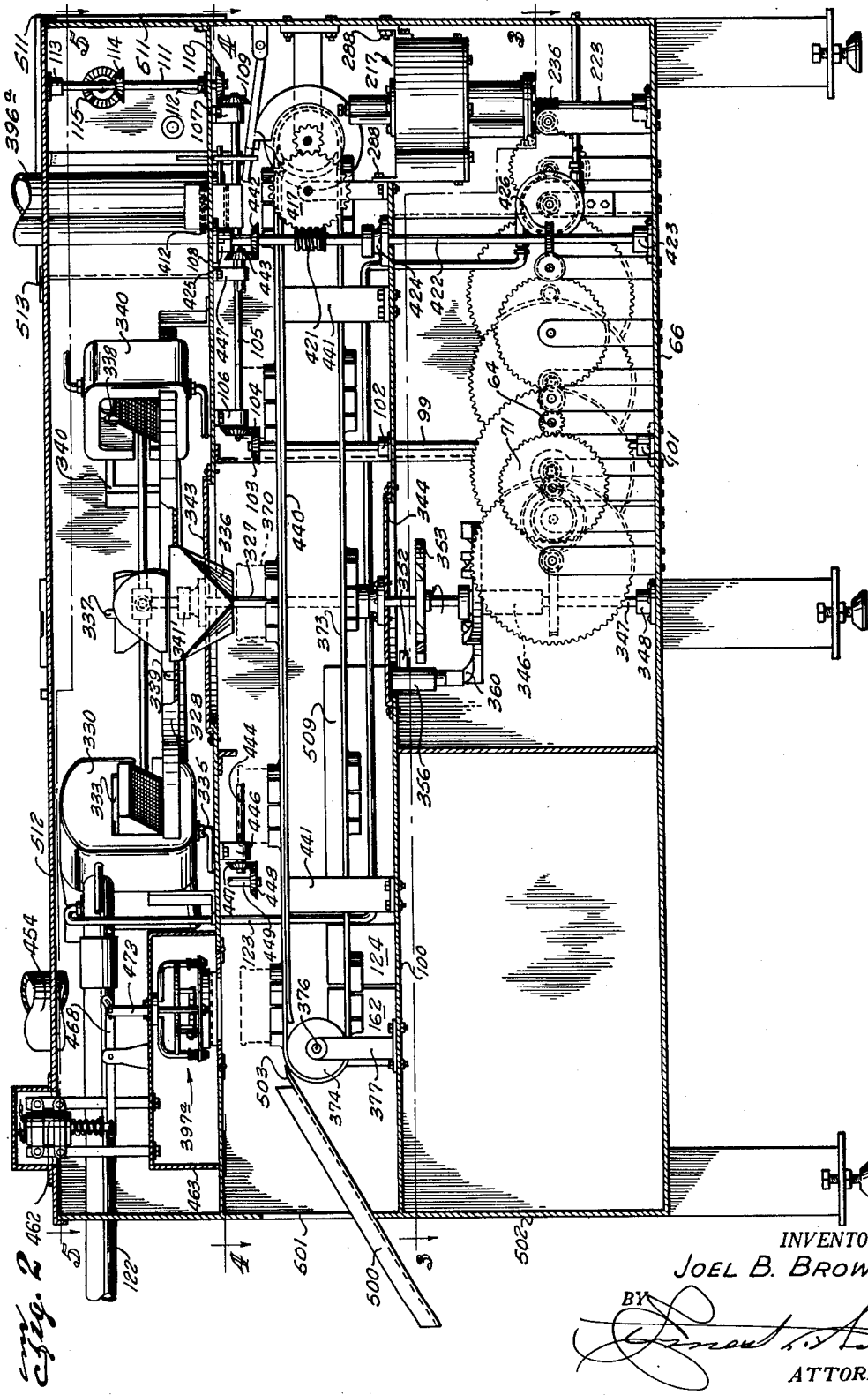
Figure 2 is a side plan view of the device with one side and some parts removed or broken away to reveal the internal mechanism.
Figure 5:
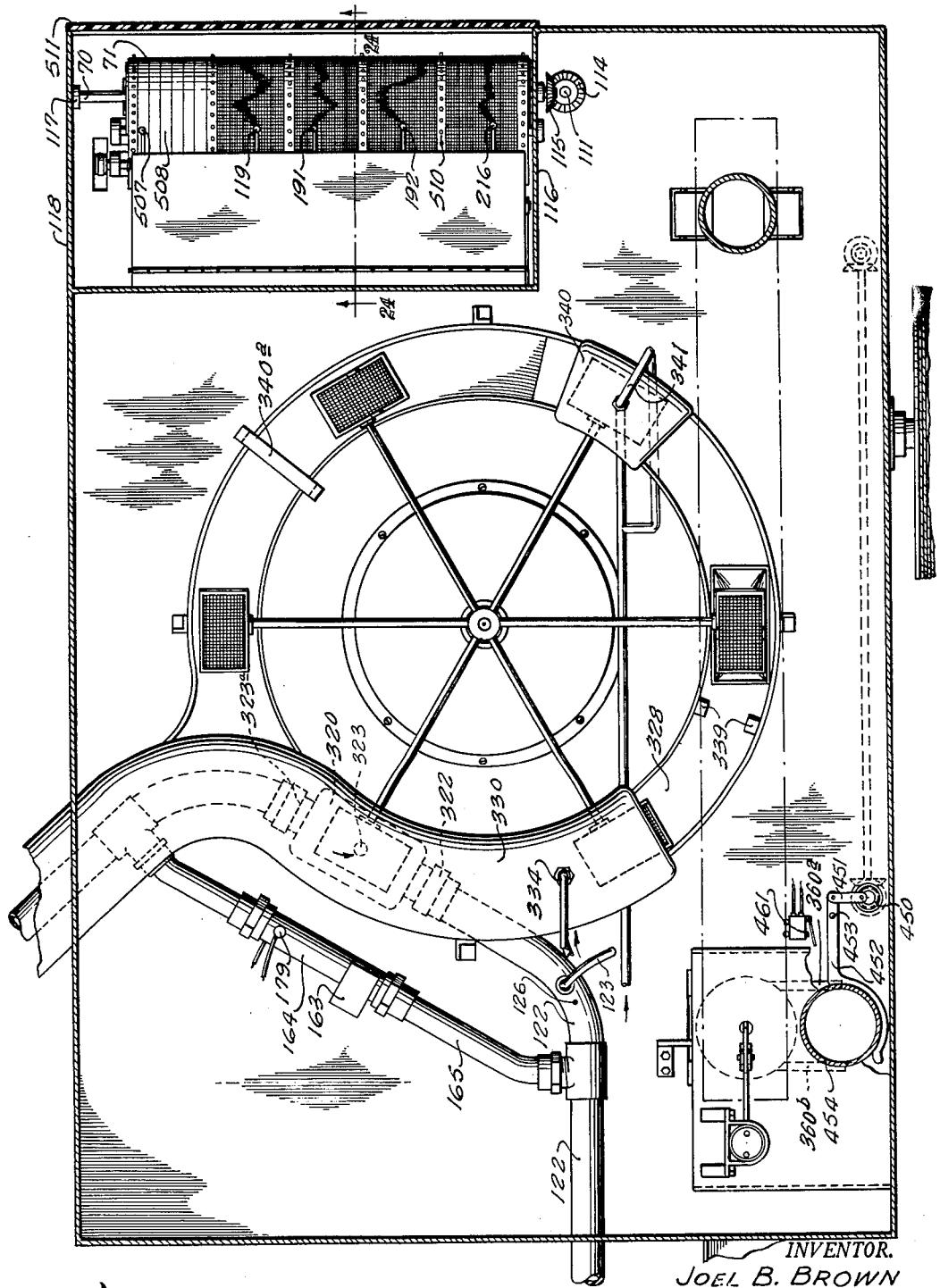
Figure 5 is a sectional view taken on line 5—5 of Figure 2.

The main shaft 49 drives the drum shaft 70 of the recorder drum 71 (Fig. 5) through a speed reducing gear train which includes the gear 71' (Figs. 2 and 3) in mesh with the gear 64, the meshing gears 72 and 73, meshing gears 74 and 75, meshing gears 76 and 77, meshing gears 78 and 79, and meshing gears 79 and 80. It will be apparent that the gears 71 and 72 are rigidly mounted on a common shaft 81a journaled in a bearing block 82 mounted on the wall 50 and in a pillow block 83, that gears 73 and 74 are rigidly mounted on a common shaft 84 journaled in pillow blocks 85 and 86, that gears 75 and 76 are rigidly mounted on a common shaft 87 journaled in pillow blocks 88 and 89 (Fig. 3), that gears 77 and 78 are rigidly mounted on a common shaft 90 journalled in pillow blocks 91 and 92, that gear 79 is rigidly mounted on a shaft 93 journaled in pillow blocks 94 and 95, and that gear 80 is rigidly mounted on a shaft 96 journaled in pillow blocks 97 and 98. The pillow blocks for the shafts are mounted on bottom deck 66. The gear 81, which is a worm gear, is rigidly mounted on a vertical shaft 99 (Fig. 2) which extends through the intermediate deck 100 and is supported by bearings 101 and 102. The vertical shaft 99 is provided at its upper end with a bevel gear 103 which meshes with a bevel gear 104 on one end of a horizontal shaft 105 which is journaled in pillow blocks 106 and 107 mounted on the upper deck 108 (Fig. 2). The other end of the horizontal shaft 105 is provided with a bevel gear 109 which meshes with a bevel gear 110 on a vertical shaft 111. The vertical shaft 111 extends through the upper deck 108 and is supported by bearing blocks 112 and 113. A bevel gear 114 mounted on the vertical shaft 111 meshes with a bevel gear 115 on the recorder drum shaft 70 (Fig. 5). The drum shaft 70 is journaled in a vertical partition 116 and in a bearing 117 mounted on the side wall 118 of the housing 51.

The recorder drum 71 is thus driven by the main shaft 64 and its rate of movement has a predetermined ratio to the rate of movement of the main shaft 64 and therefore of the drilling string in the well bore. For example, the speed reducing gear train may be so chosen that for every one hundred feet of downward movement, the recorder drum 71 will rotate a sufficient distance to cause the pens bearing the paper strips on the drum to make marks one inch long.

*Gas content*

The pen or stylus 119 (Fig. 5) may be employed to record the gas content of the earth formations traversed by the drilling bit 34. The gas from such formations is carried along by the drilling fluid or mud up between the drilling string 33 and the well casing 120 (Fig. 1) and through the main conduit or pipe 121 to a mud pit (not shown). A by-pass conduit or pipe 122 is connected to the main conduit and some of the mud passes up through the by-pass conduit 122 and into the housing 51. A gas exhaust conduit 123 (Fig. 5) is connected to the by-pass conduit 122 and extends down through the upper deck 108 of a conventional hot-filament type gas detector 124 (Fig. 2). A vacuum pump 125 is also connected to the gas detector 124 in the conventional manner to help create a small vacuum in the gas detector and conduit 123 to aid in the release of gas from the mud. A small breather hole 126 (Fig. 5) in the by-pass conduit 122 helps to allow the passage of gas into the conduit 123 by relieving the partial vacuum created in the by-pass conduit by the pump 125 (Fig. 3).

Figure 3:
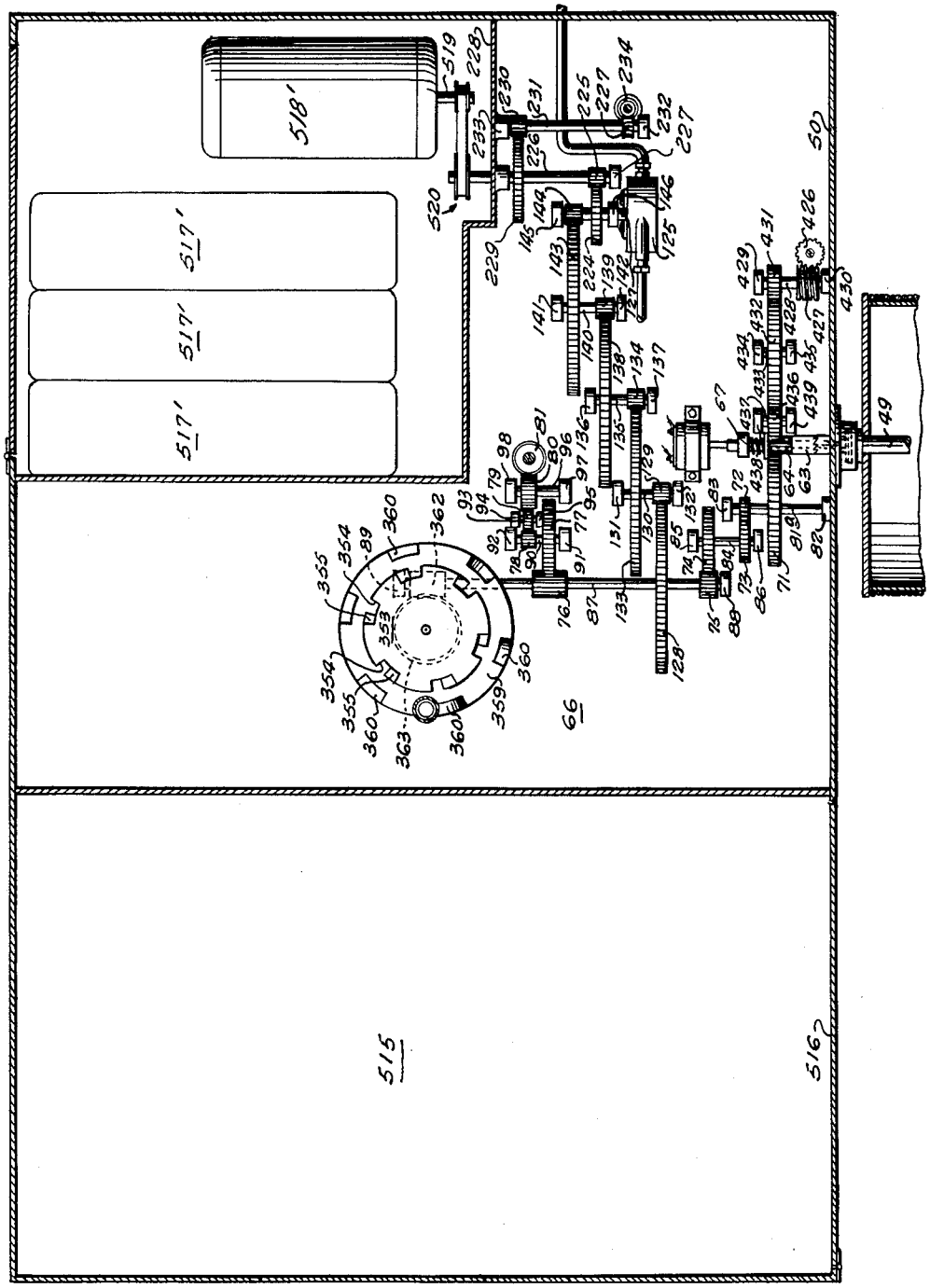
Figure 3 is a sectional view taken on the line 3—3 of Figure 2.

The drive shaft 127 of pump 125 is connected to the shaft 87 through a gear train in order to increase the speed of rotation of the pump drive shaft 127 (Fig. 3). This gear train includes a large gear 128 on shaft 87 meshing with a small gear 129 on a shaft 130, journaled in pillow blocks 131 and 132. A large gear 133 is also mounted on the shaft 130 and meshes with a small gear 134 mounted on a shaft 135 journaled in pillow blocks 136 and 137. A large gear 138 is also mounted on the shaft 135 and meshes with a small gear 139 mounted on a shaft 140 journaled in pillow blocks 141 and 142. A large gear 143 on the shaft 140 meshes with a small gear 144 on the drive shaft 127 of the pump. The drive shaft 127 is journaled in pillow blocks 145 and 146 (Fig. 3).

The variations in the resistance of the hot-filament of the gas detector 124 due to variations in the amount of gas reaching the detector are amplified by an amplifier 147 (Fig. 18), of any conventional design to deliver an amplified varying current to a motor 148 which varies the position of a contact 149 of a rheostat 150 in accordance with the resistance of the hot filament. The rheostat 150 in turn controls the motor 151 which controls the position of the pen 119. The motor 151 is of conventional design, such as the damper motor, "Modutrol Motor," MH #904E 26016 currently placed on the market by the Minneapolis-Honeywell Regulator Company. The direction and degree of rotation of the shaft 152 of motor 151 depends on the relative values of the fixed resistance 153 connected between the terminals 154 and 155 and the value of the resistance of the rheostat 150 connected between the terminals 155 and 156 (Fig. 18). The terminals 157 and 158 of the motor 151 are connected to a source 159 of alternating current. The shaft 152 of the motor 151 may be provided with a pulley 160 which may be connected through a belt 161 and any suitable material transmission, described below, to the pen 119 (Fig. 5) to move the pen substantially parallel to the longitudinal axis of the paper drum in accordance with the variations in amount of gas reaching the gas detector. The amplifier 147, motor 148, rheostat 150 and fixed resistance 153 may be mounted in a housing 162 on the intermediate deck 100 (Fig. 2).

*Radioactivity*

The radioactivity of the earth formations transversed in the drilling of the well is measured by a Geiger counter 163 placed over a glass tube 164 (Fig. 5) which is connected in a by-pass line 165 through which passes a portion of the mud from the by-pass conduit 122. The output of the Geiger counter may be amplified by a conventional amplifier 166 (Fig. 18) which is connected to a conventional frequency meter 167. The output of the frequency meter is delivered to a motor 168 which varies the position of the movable contact 169 of a rheostat 170 in accordance with the variations in the output of the frequency meter and therefore with the variations in the radioactivity of the mud and pieces of earth formation mixed therewith passing through the glass tube 164. The rheostat 170 in turn controls a motor 171 identical in all respects to the motor 151. The direction and degree of rotation of the shaft 172 of the motor 171 depends on the relative values of the fixed resistance 173 connected between the terminals 174 and 175 of the motor 171 and the value of the resistance of the rheostat 170 connected between the terminals 175 and 176. The terminals 177 and 178 of the motor are connected across the source of alternating current 159 (Fig. 18).

*Resistivity*

The resistivity of the earth formations traversed by the drilling bit is measured by a pair of electrodes 179 and 178' which project from opposite sides into the glass tube 164 (Fig. 5). The resistance of the mud and pieces of formation mixed therewith passing between the electrodes 179 and 178' is detected by an ohmmeter and amplifier 180a whose output is used to drive a motor 181 (Fig. 18) which moves the contact 182 of a rheostat 183a in accordance with the variations in the resistivity of the mud passing between the electrodes. The rheostat 183a in turn controls a motor 171 identical in all respects to the motor 151. The direction and degree of rotation of the shaft 184 of the motor 183 depends on the relative values of the fixed resistance 185 connected between the terminals 186 and 187 of the motor 183 and the value of the resistance of rheostat 183a connected between the terminals 187 and 188. The terminals 189 and 190 of the motor 183 are connected across the source of alternating current 159 (Fig. 18).

Figure 25:
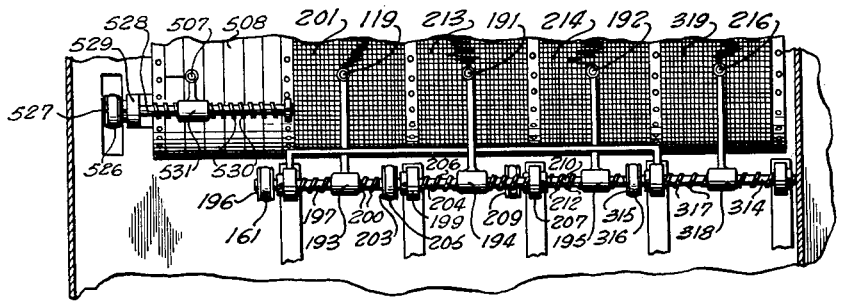
Figure 25 is a fragmentary top plan view of the pen driving mechanism.

The motors 151, 171 and 183 drive the pens 119, 191 and 192 (Figs. 5 and 25) which are mounted on internally threaded sleeves 193, 194 and 195, respectively. The belt 161 of the motor 151 passes over a pulley 196 on a shaft 197 journaled in brackets 198 and 199. The shaft 197 is provided with a screw 200 which engages the internally threaded sleeve 193 mounted on the shaft 197. It will be obvious that when the shaft 152 of the motor 151 rotates in one direction the sleeve 193 will move toward one side edge of the paper strip 201 and that when the shaft rotates in the opposite direction the pen sleeve will move toward the other side edge of the paper strip. In this manner, the pen 119 will ink a trace which approaches one side edge or the other of the paper strip 201 as the gas content of the formations traversed changes (Fig. 25).

The shaft 172 of motor 171 has a pulley 202 which is connected to a pulley 203 on a shaft 204 by a belt 205. The shaft 204 has a screw 206 which engages the internally threaded sleeve 194 (Fig. 25). The shaft 204 is journaled in brackets 199 and 207. Similarly, the shaft 184 of the motor 183 is provided with a pulley 208 which is connected to a pulley 209 on a shaft 210 by a belt 211. The shaft 210 is provided with a screw 212 which engages the internally threaded sleeve 195. The pens 191 and 192 will therefore make traces on paper strips 213 and 214 which move toward one side or another of the paper strips in accordance with the variations in the radioactivity and resistivity of the formations traversed by the drilling bit. The pulleys mounted on the shafts provided with screws are of lesser diameters than the pulleys mounted on the motor shafts to obtain a greater mechanical advantage in the belt and pulley transmission.

*Hardness of formations*

As has been developed above, the hardness of the formations traversed by the drilling bit 34 during the drilling of a well cannot be determined simply by the rate of penetration of the drill bit through a formation since variations in the weight bearing on the bit, in the rate of rotation of the bit and in the pressure of the mud, as well as variations in the hardness of the formations will vary the rate of penetration of the drill bit. It is necessary, therefore, to control the motor 215, which drives the pen 216, in accordance with the weight bearing on the drill, with the rate of rotation of the bit, and with the mud pressure as well as the rate of penetration.

The rate of penetration is detected by a centrifugal device 217 (Figs. 2 and 6) which varies the resistance of a rheostat 218 by moving contacts 219 and 220 and a resistance 221 and a metal bar 222, respectively, in accordance with the speed of rotation of the main shaft 64.

The drive shaft 223 of the centrifugal device 217 is connected to the drive shaft 127 of the pump 123 through a gear train (Fig. 3) which includes a large gear 224 on shaft 127 which meshes with a small gear 225 on a shaft 226 journaled in a pillow block 227 and a vertical partition 228. A large gear 229 mounted on the shaft 226 meshes with a small gear 230 on a shaft 231 journaled in a pillow block 232 and a bearing 233 on the vertical partition 228. A gear 234 (Figs. 3 and 6) on the shaft 231 meshes with a worm 235 in the drive shaft 223 of the centrifugal device. It will be apparent that the drive shaft 223 will be rotated at a relatively high speed as compared to main shaft 64 since the gear train between the two increases greatly the speed of rotation of the drive shaft 223.

The upper end of the drive shaft 223 is provided with a bore 236 which receives the lower end of a vertically slidable shaft 237. The drive shaft 223 is also provided with a pair of opposed aligned slots 238, one of which is indicated in broken lines in Figure 6. A pin 239 extending transversely through the shaft 237 extends into the slots 238 to limit the upward movement of the shaft 237 when the opposite ends of the pin 239 abut the upper ends of the slots. The contacts 219 and 220 are mounted on a sleeve 240, which is rotatably mounted on the shaft 237 between two annular members 241 and 242 rigidly mounted on the shaft 237 to prevent vertical movement of the sleeve 240 relative to the shaft 237. A bearing 243 may be interposed between the sleeve and the shaft to reduce friction.

The upper end of shaft 237 (Fig. 6) is provided with an annular flange 244 which rests on the top 245 of the housing 246 to limit the downward movement of the shaft 237. The housing 246 is closed at its bottom by a plate 247 which is secured to the side wall of the housing by bolts 248. The plate 247 has a central bore or opening 249 through which the shaft 237 extends. A pair of ball bearing assemblies 250 and 251 are disposed in the central opening 249 between the plate 247 and the shaft 237.

The plate 247 supports a disk 252 (Fig. 6) which has a pair of parallel vertical flanges 253 and 254. The disk 252 rests on a ball bearing assembly 255 mounted in a circular groove in the upper surface of the plate 247. The disk 252 has a central toothed aperture whose teeth engage the splines 256 on the shaft 237 so that the disk is constrained to rotate with the shaft.

A pair of L-shaped levers 257 and 258 (Fig. 6) are pivotally mounted between the flanges 253 and 254 on the pins 259 and 260, respectively, which extend between and are mounted on the flanges. The inner ends of the levers are bent outwardly to lie on opposite sides of shaft 237 and are provided with elongate slots 261. A pin 262 extends through the shaft 237 and through the slots 261 of the levers so that when the levers 257 and 258 are pivoted outwardly about their pins 259 and 260, respectively, due to the centrifugal force of the weights 263 and 264 on the outer ends of levers 257 and 258 when the shaft 237 is rotated, the inner end of the levers will exert an upward force on the pin 262 and move the shaft 237 upwardly.

The resistance 221 and the metal bar 222 (Fig. 6) are mounted in elongate five-sided insulators 265 and 266 so that only one side of each is exposed. The insulators are held in position beneath the plate 247 by a cylindrical housing 267 having an outwardly extending annular flange 268 secured to the plate 247 by bolts 269. The housing 267 is also provided with a lower outwardly extending annular flange 270 (Fig. 19) to which is secured a bottom plate 271 by means of bolts 272. An inner supporting sleeve 273 telescoped into housing 267 is disposed between the plate 247 and the bottom plate 271. The upper portion of the sleeve is provided with two oppositely located recesses in which are disposed the insulators 265 and 266. The housing 267 is provided with two apertures through which extend the terminals 274 and 275 which contact the resistance 221 and the metal bar 222, respectively. A pair of insulating sleeves 276 and 277 (Fig. 6) prevent contact of the terminals 274 and 275, respectively, with the housing 267.

In order to regulate the degree of vertical movement of the shaft 237 with changes in the speed of rotation of drive shaft 223, a housing 278 having an outwardly extending annular flange 279 is mounted on the top 245 by means of bolts 280 which secure the flange 279 to the top 245. A spring 281 is disposed in the housing 246 and bears against disked plates 282 and 283. Ball bearings 284 are interposed between the flange 244 of shaft 237 and the plate 283. The downward force exerted by the spring 281 may be varied by rotation of the adjusting screw 285 threaded in a bore in the top 286 of the housing. The screw 285 will move the plate 282 vertically when rotated. A lock nut 287 (Fig. 6) is provided to maintain the adjusting screw 285 in place. The housing 246 is secured in place by bolts 288.

The mode of operation of the centrifugal device 217 will now be apparent. As the speed of rotation of the drive shaft varies, the centrifugal force exerted on the weights 263 and 264 will vary, thus varying their outward pivotal displacement about the pins 259 and 260. This in turn will vary the vertical position of shaft 237 and thus vertically move the contacts 219 and 220 on the resistance 221 and the bar 222. Since the contacts 219 and 220 are connected by a conductor 289, the resistance between the terminal pins 274 and 275 will vary, being smallest when the speed of the shaft is greatest and the shaft 237 is raised to its highest position. It will also be noted that the full weight of the disk 252, the levers 257 and 258 and the weights 263 and 264 is supported on the plate 274. The shaft 237 does not carry or support the weight of the shaft raising apparatus. As a result, the degree of the vertical movement of the shaft 237 with change of speed of rotation is quite uniform over wide ranges of speed and can be easily regulated by adjustment of the screw 285 (Fig. 6).

Since the shaft 223 is geared to the gear 64 which in turn is connected to the drilling string 33 to rotate in accordance with the downward movement of the drill string, the speed of rotation of the shaft 223 will vary directly as the rate of downward movement of the drill string and therefore of the rate of penetration of the earth formations by the drill bit 34. The resistance of rheostat 218 will therefore vary indirectly as the rate of penetration.

The variations in the pressure of the drilling fluid or mud may be detected by a conventional pressure detecting device or gauge 290 (Fig. 1) connected to pump 35 or to a suitable conduit of the mud line. The pressure detecting device may be connected through a hydraulic connection 291 to a conventional diaphragm type transmission 292 (Fig. 18) which moves a contact 293 on a rheostat resistance 294 to vary the resistance directly in accordance with variations in the mud pressure.

The variations in the weight bearing on the drill bit 34 are detected by the conventional weight indicator 295 (Fig. 1) on the dead line end of cable 45. The weight indicator is connected through the hydraulic connection 296 to a conventional diaphragm type transmission 297 which moves a contact 298 on a rheostat resistance 299 (Fig. 18) in accordance with variations in the weight bearing on the drill bit.

Variations in the speed of rotation of the drill bit are detected by a conventional speed gauge 300 whose rotatable shaft 301 is connected to the table 47 to rotate therewith. The speed gauge 300 is connected through the hydraulic connection 302 to a conventional diaphragm type transmission 303 (Fig. 18) which moves a contact 304 on a rheostat resistance 305 in accordance with the variations of the speed of rotation of the drill bit.

The rheostat resistances 221, 294, 299 and 305 (Fig. 18) are connected in series between the terminal leads 306 and 307 of the motor 215. A fixed resistance 308 is connected between the terminals 306 and 309 of the motor 215 while the terminals 310 and 311 are connected across the source of alternating current 159. As in the other pen motors, the direction and degree of rotation of the shaft 312 of motor 313 depends on the relative value of the fixed resistance 308 and of resistances 221, 294, 299 and 305 between the terminals 306 and 307.

The shaft 312 is provided with pulley 313 (Figs. 4 and 25) and is connected to the shaft 314 provided with a pulley 315 by a belt 316 which passes over the pulleys. The shaft 314 has a screw 317 which engages the internally threaded sleeve 318 disposed on the shaft 314. The pen 216 is mounted on sleeve 318 (Fig. 25).

In operation, the weight on the drill bit, the mud pressure, and the speed of rotation of the drill bit are set at optimum values. The contacts 293, 298 and 304 will then be on intermediate points on their associated rheostat resistances. As long as the optimum values of these three variable factors are not departed from, the position of pen 216 on the paper strip 319 will vary only with the variations in the position of contact 219 on resistance 221 and therefore only with the rate of penetration. Under these optimum conditions, the rate of penetration is a true indication of the hardness of the earth formations. However, since these factors are variable and affect the rate of penetration, any departure from the optimum values of the weight, mud pressure and rate of rotation of the drill bit must be compensated for. Such compensation is accomplished by the variations in the values of resistances 294, 299 and 305 caused by departures from the optimum values so that the line traced by pen 216 on paper strip 319 will give a true indication of the hardness of the earth formations pierced by drill bit 34 irrespective of variations in the weight on the drill bit, the rate of rotation of the drill bit and the mud pressure.

Sampling device

It is also desirable to secure samples of the earth formations traversed by the drill bit 34. Pieces or cuttings of the earth formations are carried by the mud through the by-pass conduit 122 (Fig. 5). An enlarged hollow conduit 320 is connected in the by-pass conduit 122 by conventional couplings 322 and 323a. The enlarged conduit 320 has an aperture 323 through which drops portions of mud and the pieces or cuttings of earth formations mixed therewith as they travel through the by-pass conduit out the enlarged conduit. The by-pass conduit 122 has a section thereof immediately preceding the enlarged conduit provided with spirally arranged risers 324 (Fig. 10) which cause the mud to swirl in its passage through the by-pass conduit and the enlarged conduit to prevent blocking of the aperture 323 and to insure deposition of representative samples in buckets 325.

The buckets 325 are made of wire mesh and are rotatably mounted on arms 326 which extend radially from a shaft 327 (Fig. 10). A pin 327a rigidly secured to each arm 326 is adapted to bear against stops 327b and 327c (Fig. 12) on each bucket to limit rotary movement of the buckets on the arms 326. The buckets travel over a channel-shaped track or drain 328 (Fig. 5) which is substantially circular as viewed from above and is connected with an outlet 329 (Fig. 10) through which extends the by-pass conduit 122. The drain 328 (Fig. 5) has an extension which forms a housing 330 over the enlarged conduit 320. An elongated opening 331 in the housing permits the arms 326 to extend into the housing. The ends of the housing are provided with openings 332 and 333 to permit passage of the buckets into the housing and beneath the aperture 323.

Each bucket moves beneath the aperture 323 and is held motionless there until the drill bit descends a predetermined distance. The bucket receives a sample of mud and earth formation while it is positioned beneath the aperture 323. It is then moved between two water sprays 334 and 335 which wash the mud from the pieces of earth formations. The bucket moves on to a drain position A where it stands until the drill bit again moves a predetermined distance downwardly. It then moves to a discharge position B where it is rotated to an upside down position to discharge its load or sample of earth formation through a chute 336 (Fig. 2) in the drain 328. The bucket is turned upside down by the contact of its two depending lugs 337 and 338 with a stop 339 (Fig. 10) disposed on the drain immediately preceding the chute 336. The buckets are weighted on one side by weights 340 to facilitate their movement from upright to upside down position once the lugs 337 and 338 (Fig. 12) contact stop 339 during the movement of the bucket to the position B over the chute. The chute 336 has upper edges which extend above the drain 328 so that any water which may be on the drain will not flow down the chute with the sample.

The bucket then remains at position B until the drill bit again descends the predetermined distance when it is moved to position C in a housing 340, similar to housing 330, over and under a pair of water sprays 341 (Fig. 10). The sprays 334, 335 and 341 are connected to any suitable source of water. The bucket remains at position C until the drill bit again descends a predetermined distance when it is moved to position D where it drains. The bucket again remains at position D until the drill bit again descends a predetermined distance when it is moved to position E. In the movement from position D to E, the bucket moves through a U-shaped bracket 340a (Fig. 5) whose top portion contacts the lugs 337 and 338 and rotates the bucket to upright position. The bucket remains at position E until the drill bit again descends a predetermined distance when it is moved beneath the aperture 323 to again receive a load of mud mixed with pieces of earth formations.

The buckets 325 are moved in the manner described by the shaft 327 which is supported by ball bearing assemblies 341' and 342 on circular plates 343 and 344 (Fig. 2), respectively, which are mounted on the decks 108 and 100, respectively, by means of bolts and which close circular apertures in these decks. The shaft 327 extends into a central bore 345 in a sleeve 346 (Fig. 20) rigidly secured to the upper end of a shaft 347. The lower end of shaft 347 is supported by a bearing 348. The lower end of the shaft 327 is provided with an annular flange 349 which bears on ball bearing 350 interposed between the bottom of the bore 345 and the flange (Fig. 20).

A spring 351 (Fig. 20) disposed in bore 345 and about shaft 347 has its lower end rigidly secured to the flange 349 while its upper end is rigidly secured to the sleeve 346 so that sleeve 346 may be rotated about the shaft 327 against the resistance of spring 351 when the shaft 327 is locked against movement by the engagement of a latch 352 with a disk 353. The wheel 353 is provided with a plurality of notches 354 into which the latch may descend. The upper surface of the disk 353 is provided with angled surfaces 355 which slope downwardly to the notches to facilitate the entry of the latch into the notches. The latch has a vertical extension 355a slidingly disposed in a sleeve 356 provided with a longitudinal slot 357 through which the latch 352 extends. The vertical extension is biased downwardly by a spring 358 in the sleeve which bears against the disk 344 to which the sleeve is rigidly secured and against the upper end of the latch 352 (Fig. 20).

The lower end of the extension 355a bears against the upper surface of a disk 359 (Fig. 20) which is provided with a plurality of cams 360 which are adapted to move the extension 355a, and therefore the latch 352, upwardly when the disk 359 is moved to bring a cam underneath the extension. The disk 359 is rigidly secured to sleeve 346 and rotates with it.

The shaft 347 and sleeve 346 are rotated by means of a worm gear 362 on shaft 87 which meshes with a gear 363 on the shaft 347. It will be apparent now that if the latch 352 is in its lowermost position disposed in a notch 354 in the disk 353 and the gear 363 is rotated, the shaft 347 and sleeve 346 will rotate against the resistance of the spring 351 until the extension or cam follower 355a (Fig. 20) is lifted by one of the cams 360. The latch 352 will then move out of the notch 354 and the disk 353 and the shaft 327 will be rotated by the energy stored in the spring 351. The shaft 327 will, of course, rotate in the same direction as the direction of rotation of shaft 347. Since the cams 360 (Figs. 3 and 20) drop abruptly, the latch 352 will be allowed to descend very shortly after it has been raised out of engagement with a notch 354. The latch will then rest on the top surface of disk 353 and slide down the next angled surface 355 into the next notch 354 in the disk 353 as the disk 353 and shaft 327 are rotated by the spring 351. It will now be apparent that the disk has six notches 354, each corresponding to one of the six positions in which the buckets may be held and that the disks 359, 353, and the latch 352 and the spring 351 cooperate to move the buckets 325 (Fig. 10) from one position to the next, each time the drill bit descends a predetermined distance since the gear 64 is rotated only while the drill bit moves downwardly. The number and spacing of the cams determines how many samples will be taken for a given depth of well drilled.

The samples of earth formations discharged into the chute 336 (Fig. 2) are received in containers 370 held by pairs of arcuate upward projections 371 and 372 (Fig. 13) on an endless belt 373 (Fig. 4) which is moved intermittently below and past chute 336. The belt extends about a pair of spaced pulleys 374 and 375 (Fig. 2). The pulley 374 is mounted on a shaft 376 journaled in brackets 377 and 378 mounted on the intermediate deck 100. The drum 375 (Fig. 22) is mounted on a shaft 379 one of whose ends is journaled in a bracket 380. The other end of shaft 379 extends into the central bore 381 of a sleeve 382 (Fig. 23). The shaft 379 is provided with an annular flange 383 disposed in sleeve 382. A spring 384 has one end secured to the flange 383 and the other to the sleeve 382 so that the sleeve 382 may be rotated against the resistance of spring 384 while the shaft 379 is held stationary by a latch 385 which engages a stop 386 disposed along the periphery of a disk 387 rigidly secured to the shaft 379.

The latch 385 (Fig. 22) and a cam follower 388 depends from the spaced arms 389 and 390 of a bifurcated member 391 which is pivotally mounted on a shaft 392 journaled in brackets 393 and 394. The brackets 393 and 394 may be mounted on a wall 395 of the housing 51. The cam follower 388 and the latch 385 cooperate in the same manner as the cam follower 355a (Figs. 2 and 20) and latch member 352 of the bucket 325 drive assembly to rotate the pulley 375 a predetermined distance during the drilling of the well. The cam follower 388 follows a cammed disk 396 rigidly mounted on the sleeve 382. A shaft 397 is rigidly secured to the sleeve 382. The shaft 382 is geared to the main shaft in a manner to be described below. The pair of arcuate projections on the belt 373 are so spaced that a container is always disposed beneath the chute 336, another container is disposed beneath a container magazine 396a (Fig. 22) and still another container is disposed beneath a lid or cap dispensing and stamping mechanism 397 when the belt is stationary.

The containers are disposed from the magazine 396a by means of two opposed pairs of vertically spaced leaves 398 and 399 (Fig. 22) which are rigidly mounted on shafts 400 and 401. The ends 402 and 403 of the shafts 400 and 401, respectively, extend through slots 404 (one of which can be seen in Figure 22), in a bar 406. The bar 406 is slidably disposed between strips 407 and 408 at one end and between strips 409 and 410 at the other end, the strips holding the bar in proper vertical position. The bar 406 is provided with a dependent extension having a slot 411 through which extends the outer end of the arm 390 of the bifurcated member 391 (Fig. 22).

The upper leaves 398 extend into the magazine 396a through opposed slots 412 in the sides of the magazine while the lower leaves 399 extend just below the open lower end of the magazine. In operation, as the arm 390 is raised by the cam 413, the bar 406 is moved upwardly rotating the shafts 400 and 401 to withdraw the upper leaves 398 (Fig. 22) from beneath the lowermost container in the magazine and to move the lower leaves 399 beneath the magazine to retain the lowermost container which thus drops to the lower leaves. The two pairs of leaves remain in this position until the disk 387 rotates to a position in which the latch moves down to the position shown in Figure 22 and thus causes the arm 390 to move downwardly. At such time, of course, the belt 373 will be stationary. The bar 406 is moved downwardly causing the shafts 400 and 401 to rotate in the opposite direction. This rotation of the shafts moves the leaves 398 inwardly between the lowermost and second lowermost containers in the magazines and moves the lowermost leaves outwardly to allow the lowermost container to drop between the pair of arcuate projections 371 and 372 which are now positioned directly beneath the magazine. The leaves 398 and 399 are resilient and may bend slightly as required during the dispensing operation.

The shaft 397 secured to the sleeve 382 is journaled in a bearing 415 (Fig. 23). A gear 416 rigidly mounted on shaft 397 meshes with a gear 417 mounted on a shaft 418 journaled in a bearing 419 (Fig. 4) and a pillow block 420. The gear 417 meshes with a worm gear 421 (Fig. 2) on a vertical shaft 422 (Fig. 4) supported in bearings 423, 424 and 425. A second gear 426 (Fig. 2) meshes with a worm gear 427 (Fig. 3) on a shaft 428 journaled in pillow blocks 429 and 420. A second gear 431 on shaft 428 meshes with a gear 432 on a shaft 433 journaled in pillow blocks 434 and 435. The gear 432 also meshes with a gear 436 mounted on a shaft 437 journaled in pillow blocks 438 and 439. The gear 436 in turn meshes with gear 64. In this manner, the conveyor or belt 373 and the container dispensing mechanism is driven in accordance with the downward movement of the drill string during drilling operation.

An elongate plate 440 (Figs. 2 and 22) mounted on brackets 441 is disposed beneath the upper portion of the endless belt 373 to support the belt against undue downward flexion.

The shaft 422 is provided at its upper end with a bevel gear 442 which meshes with a bevel gear 443 on a horizontal shaft 444. The shaft 444 is journaled in pillow blocks 445 and 446 secured to the upper deck 108 (Fig. 4) and is provided at its other end with a bevel gear 447. The gear 447 meshes with a gear 448 mounted on a shaft 449 (Fig. 2) which extends upwardly through the upper deck 108. The shaft 449 is provided with a disk 450 (Fig. 5). A link 451 has one end pivotally secured to the disk 450 at an off-center point and has its other end pivotally secured to the end of a pusher arm 452 which is pivoted at 453.

The pusher arm 452 is disposed to move beneath the lid or cap magazine 454 in which the lids 455 for the containers are stored in order to move the lowest lid from the open bottom container from beneath the magazine to a position on a pair of hinged plates 456 and 457 secured to the top deck 108 by spring biased hinges 458 and 459, respectively, and disposed in an aperture 460 on the top deck. The lid moves between a pair of spaced guides 360a and 360b mounted on top deck 108 (Fig. 5). The movements of the pusher arm 452 are synchronized with the movements of the conveyor or belt 373 so that a lid is pushed to the hinge plates after a loaded container is moved underneath the hinge plates. The pusher arm then contacts a switch 461 which energizes a solenoid 462 (Figs. 8 and 18).

The solenoid 462 is mounted on a housing 463 by means of a bracket assembly 464 (Fig. 8). The plunger 465 of the solenoid is biased downwardly by a spring 466 disposed about the plunger between a flange 467 on the bottom end of the plunger and the body of the solenoid. The plunger is connected to one end of a link 468 pivoted at 469 by means of a pin 470 which extends through a slot 471 in one end of the link. The other end of the link 468 is pivotally connected by means of a pin 472 to a push rod 473. The pin 472 extends through a slot 474 in the link 468. The push rod 473 extends through an aperture in the housing 463 and has secured to its lower end a supporting bracket 475 which includes four legs 476 (Fig. 8).

An annular press ring 477 having a horizontal annulus 478 and dependent annular flange 479 (Fig. 8) is movably secured to the legs which pass through suitable apertures in the annulus. Each of the legs has an annular flange 480 and a spring 481 disposed between the annulus and the flange 480. The lower ends of the legs are threaded to receive nuts 482. A washer 483 is interposed between the nut and the annulus 480.

The press ring 477 is adapted to fit around a lid or cap 455 disposed in the hinge plates 456 and 457 and when the solenoid is energized, to press the cap downwardly causing the hinge plates to pivot downwardly and outwardly and allow the lid to move to the top of the container held on the belt 373 directly beneath the hinge plates. The stroke of plunger 465 is sufficiently great to press the cap firmly down on the container. The cap is provided with an inner groove 483 (Fig. 15) which receives the bead 484 of the container. Both the cap and the container are made of a slightly resilient substance so that the cap will fit over the bead and upper end of a container when pressed downwardly by the press ring 477.

In order that the sample contained in each container may be easily identified, a conventional stamping device 485 (Fig. 8) is mounted on a plate 486 by means of the lugs 487 and 488. The plate 486 is rigidly secured to the legs 476. The toothed disk 489 of the stamping device is rotated each time the solenoid 462 is energized to rotate the numbered disks 490 in the conventional manner in order that each cap may be stamped with the number one higher than the number stamped on the preceding cap. The stamping device 485 is ratcheted (not shown) to prevent reverse movement of the numbered disks 490 while the teeth of the toothed disk 489 are engaged by a pawl 491 which is pivotally mounted at 492 on a bracket 493 which is mounted on the upper deck 108 by a bolt 494. The pawl 491 is biased toward the toothed disk by a spring 495 interposed between the bracket 493 and pawl 491 whose opposite end is disposed about the studs 496 and 497 on the pawl and the bracket, respectively. The pawl 491 is also provided with a leg 498 having a flange 499 which abuts the lower edge of the bracket 493 and limits the clockwise rotation (Fig. 9) of the pawl.

It will be apparent that as the bracket 475 is moved downwardly, the pawl 491 will engage one of the teeth of the toothed disk 489 and will rotate the disk a predetermined distance since the clockwise rotation of the pawl is limited by the stop 499. After a cap has been stamped and pressed on the container, the toothed disk will move upwardly past the pawl which will pivot in a counter-clockwise direction against the resistance of the spring 495 and will allow the next tooth to move past the pawl 491. During the next downward movement of the bracket 475, this latter tooth will be engaged by the pawl to again actuate the disks 490 and cause a number to be stamped on the next cap which is higher by one than the number stamped on the preceding cap.

An inclined chute 500 (Fig. 2) extends through an opening 501 in the end wall 502 of the housing 51 and has a tongue 503 which overlies the belt 373 adjacent the pulley 374 and which is narrower than the gaps 504 between the arcuate projections 371 and 372 and the belt so that the capped containers held between the arcuate projections will slide down the chute as the belt moves around the pulley 374. The containers sliding down the chute may be allowed to slide into a large box (not shown) and to accumulate in large numbers before being transported from the drilling site. It will be obvious that the attendance of an operator is not necessary during operation of the sampling device.

It is desirable to obtain records of the time actual drilling of the well is not in progress, commonly known as "time off bottom" since the drilling contractor gets paid at a different rate for such time than for actual drilling time. Whenever actual drilling takes place the mud pump must be in operation. For that reason a switch 505 (Fig. 18) is secured on the mud pump 35 in such position that it is closed whenever the mud pump is not operating. The switch 505 connects a clock 506 and the solenoid 68 in series across the source 159 of alternating current when it is closed. Since the solenoid 68 will then be energized, the cable drum 48 (Fig. 16) will not be able to rotate the gear 64 and the recording and sampling device will not operate except for the clock 506 which will operate the pen 507 to trace a line on the paper strip 508 whose length will indicate the length of time actual drilling was not in progress. A second switch 508a (Fig. 18 may be connected in series with the switch 505 in order that the clock will be connected across the source of current only when the drill is actually resting on the bottom and at the same time the mud pump is not operating the switch 508a may be connected to the weight indicator 295 in any suitable manner so that it will be closed whenever the drill bit is lifted off bottom.

Figure 4:
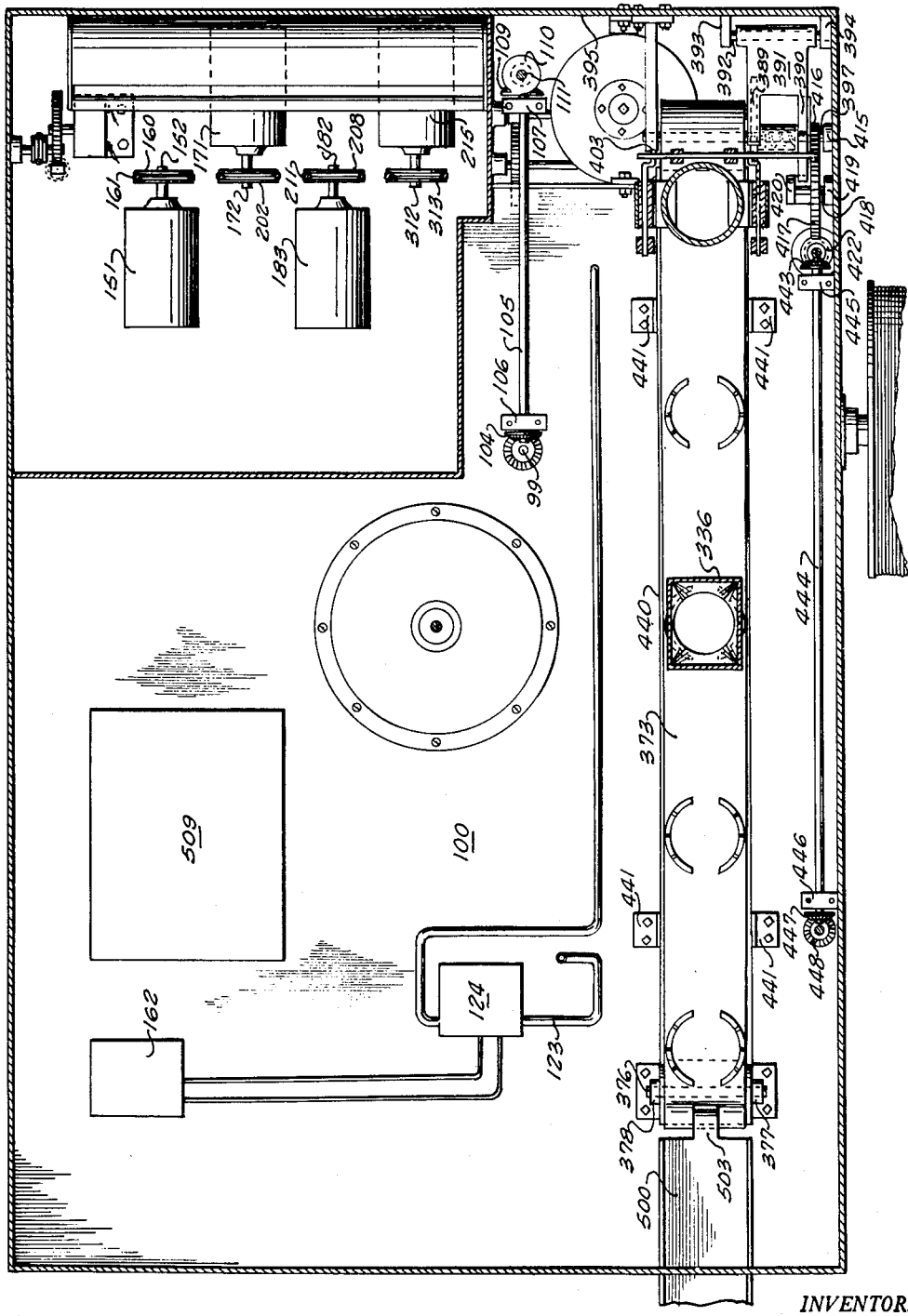
Figure 4 is a sectional view taken on the line 4—4 of Figure 2.

The various amplifiers, rheostats and diaphram type pressure devices are disposed on the intermediate deck 100 in the space generally designated by the enclosure numbered 509 (Fig. 4). The actual physical position of each rheostat, amplifier and pressure device are not shown to avoid confusion of representation.

Figure 24:
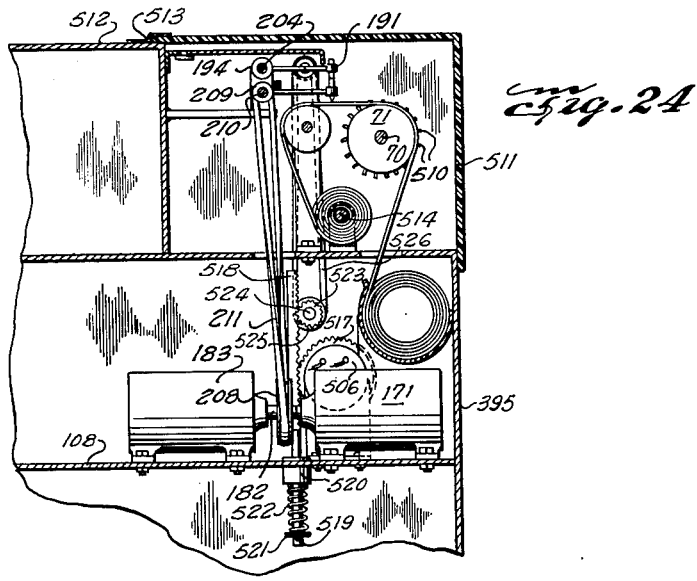
Figure 24 is a sectional view taken on line 24—24 of Figure 5.

The paper strips on drum 71 (Fig. 5) are of the conventional type having spaced perforations at their edges through which the pins 510 of the drum extend to draw the paper strips along over the drum and into a space immediately adjacent an L-shaped door 511 (Fig. 24) closing an aperture in the end wall 395 and the top 512 of the housing 51. The door 511 is connected by latches 513 to the top 512 and may be of a plastic transparent material so that records made by the pens can be easily viewed. The paper strips are pulled off rolls rotatably mounted on a shaft 514 journaled in the partition 115 and the side wall 118. If desired a single strip of paper provided with a plurality of charts or scale could be employed in place of the several strips shown.

A storage chamber 515 (Fig. 3) between the intermediate and bottom decks 100 and 66 is provided with a door 516. Various other doors may be provided as described in the walls of housing 51 to provide access to the interior of the housing.

The clock 506 (Fig. 18) has a shaft (not shown) provided with a large gear 517 (Fig. 24) which engages a rack gear 518. The rack gear has a slidable shaft 519 which extends through a bearing 520 and an aperture in top deck 108. The shaft 519 has a flange 521 and a spring 522 disposed about the shaft 519 between the bearing 520 and the flange 521 biases the shaft, and therefore the rack gear, downwardly. The rack gear also meshes with a gear 523 on a shaft 524 suitably journaled for rotation. A pulley 525 on shaft 524 is connected by a belt 526 to a pulley 527 on a shaft 528 (Fig. 25). The shaft 528 is suitably supported by a pillow block 529 and is provided with a screw 530 which engages the internally threaded sleeve 531 on which the pen 507 is mounted. It will be apparent now that when the clock 506 is energized, the gear 517 will move the rack gear downwardly against the resistance of spring 522. In such movement, the rack gear will rotate the gear 523 and thus cause the pen 507 to move to the right (Fig. 25). The pen will draw a straight line on strip 508 since the paper drum will be stationary. When the clock is de-energized by the opening of switch 505, the spring 522 will move the rack gear down to again rotate gear 523 but in the opposite direction. The pen 507 will thus be moved to the left hand side of the paper strip. The length of the horizontal lines drawn by the pen 507 will indicate the duration of the periods actual drilling operations were not taking place, i. e., time off bottom.

The motors 148, 168 and 181 (Fig. 18) driving the rheostats may be of the galvanometer type and could, if it were so desired, drive the pens directly. The Geiger counter, the gas detector, the ohmmeter, the rheostat motor and the amplifiers may be connected in any conventional manner to the batteries 517' (Fig. 3) to be energized thereby. A generator 518' whose shaft 519 may be connected by a belt and pulley transmission to the shaft 226 may be employed to charge the batteries. The electrical connections between the generator and batteries being well known, they are not shown.

If desired and if the values permit, the hot-filament of the gas detector can be used directly as the resistance 150 thus obviating the need of the amplifier 147, the motor 148 and the rheostat 149. It will be apparent that the resistance of the hot-filament will vary with variations in the gas content obtained from the mud.

Similarly, the resistance of the mud and cuttings between the electrodes 179 and 180 could be substituted for the resistance 183 if the varying resistance of the mud between the electrodes were of the proper value. In this case, the ohmmeter 180a, the motor 181 and the rheostat 182 would be dispensed with.

The Geiger counter 163 could also be connected in any other conventional way to vary a resistance between terminals 187 and 188.

The centrifugal device 218 could, if it were so desired, be replaced by any other suitable device for varying a resistance connected between the terminals 306 and 307 in accordance with the rate of penetration of the drill bit. For example, a device responsive to the variations in the voltage produced by the generator 518' could be employed to vary a resistance connected in series with the resistances 293, 299 and 305 in place of the resistance 221. The voltage generated by generator 518', of course, varies directly as the rate of descent of the drill string.

The Geiger counter, if desired, could be located adjacent position A to detect the radioactivity of the washed samples of the earth formations held by the buckets 325 while at that position.

The various gear ratios may be so chosen that samples of earth formations may be obtained for any predetermined number of feet of descent of the drilling bit. For example, one sample may be obtained for every five feet of penetration of the earth by the drill bit. The sample secured at any instant of time will not, of course, be from the exact level whose characteristics are recorded at that instant on the chart. The depth of level from which each sample is secured may be determined by conventional means such as the mud flow graph now conventionally employed.

It will be apparent now that a recording and sampling device has been described and illustrated which records simultaneously the gas content, radioactivity, resistivity and hardness of earth formations traversed during drilling operations and also automatically obtains washed and drained samples of the earth formations which are sealed in containers, the containers being delivered to the exterior of the device. Moreover, it will be apparent that the buckets are thoroughly washed and drained after unloading a previous sample so that each sample is pure and not contaminated by remains of previous samples. Furthermore, it will be evident that the recording and sampling device is automatic in operation and does not require the constant attention of an operator.

It will be apparent to those skilled in the art that various changes and modifications can be made without departing from the invention and it is intended therefore in the appended claims to cover all such changes and modifications as fall within the true spirit and scope of the invention.

What is claimed is:

1. In a sampling device for obtaining samples of formation cuttings carried in drilling fluid used in rotary well drilling: a conduit for carrying drilling fluid mixed with formation cuttings, said conduit having an opening for discharging a portion of the drilling fluid in said conduit, an annular, horizontally disposed drain of substantially U-shape in transverse section having a portion underlying said opening; a plurality of foraminated buckets mounted for movement in said drain, said buckets being spaced from each other along said drain, each of said buckets being movable successively to a position beneath said opening to receive a sample of drilling fluid and formation cuttings discharged therethrough; means above and below said drain at a first washing position to wash said drilling fluid from the sample of drilling fluid and formation cuttings held in a bucket at the first washing position; means carried jointly by said drain and bucket cooperating at an unloading position to invert and unload the bucket of the formation cuttings remaining in the bucket after the drilling fluid is washed away; means above and below said drain at a second washing position for washing the bucket of any formation cuttings remaining after unloading at the unloading position; and means for intermittently and simultaneously moving said buckets along said drain, whereby said buckets successively unload samples of formation cuttings carried by the drilling fluid.

2. In a sampling device for obtaining samples of formation cuttings carried in drilling fluids used in rotary well drillings: a conduit for carrying drilling fluid mixed with formation cuttings, said conduit having an opening for discharging a portion of the drilling fluid in said conduit, an annular drain having a portion underlying said opening; a plurality of buckets mounted for movement in said drain, said buckets being spaced from each other along said drain, each of said buckets being movable successively to a position beneath said opening to receive a sample of drilling fluid and formation cuttings discharged therethrough; means disposed above and below said drain at a first washing position to wash said drilling fluid from the sample of drilling fluid and formation cuttings held in a bucket at the first washing position; means carried jointly by said bucket and drain cooperating at an unloading position to unload the bucket of the formation cuttings remaining in the bucket after the drilling fluid is washed away; means above and below said drain at a second washing position for washing the bucket of any formation cuttings remaining after unloading at the unloading position; means for intermittently and simultaneously moving said buckets along said drain, whereby said buckets successively unload samples of formation cuttings carried by the drilling fluid; means for successively positioning empty containers at said unloading position to receive the samples of formation cuttings unloaded from said buckets; and means synchronized with said means for moving said buckets for driving said container positioning means to position an empty container beneath said unloading position after the preceding container receives a sample.

3. In a sampling device for obtaining samples of formation cuttings carried in drilling fluid used in rotary well drilling: a conduit for carrying drilling fluid mixed with formation cuttings, said conduit having an opening for discharging a portion of the drilling fluid in said conduit, an annular drain having a portion underlying said opening; a plurality of buckets mounted for movement about said drain, said buckets being spaced from each other along said drain, each of said buckets being movable successively to a position beneath said opening to receive a sample of drilling fluid and formation cuttings discharged therethrough; confronting water spraying devices at a first washing position between which said buckets pass in said drain to wash said drilling fluid from the sample of drilling fluid and formation cuttings held in a bucket at the first washing position; means at an unloading position engaging cooperating means on said bucket to unload the bucket of the formation cuttings remaining in the bucket after the drilling fluid is washed away; water spray devices in confronting relationship above and below said drain; at a second washing position for washing the bucket of any formation cuttings remaining after unloading at the unloading position; means for intermittently and simultaneously moving said buckets along said drain, whereby said buckets successively unload samples of formation cuttings carried by the drilling fluid; means for successively positioning empty containers at said unloading position to receive the samples of formation cuttings unloaded from said buckets; means synchronized with said means for moving said buckets for driving said container positioning means to position an empty container beneath said unloading position after the preceding container receives a sample; and means for placing a lid on each filled container.

4. In a sampling device for obtaining samples of formation cuttings carried in drilling fluids used in rotary well drilling: a conduit for carrying drilling fluid mixed with formation cuttings, said conduit having an opening for discharging a portion of the drilling fluid in said conduit, an annular drain; a plurality of buckets mounted for movement in said annular drain, said buckets being spaced from each other along said drain, each of said buckets being movable successively to a position beneath said opening to receive a sample of drilling fluid and formation cuttings discharged therethrough into said drain; spray devices mounted above and below said drain at a first washing position to wash said drilling fluid from the sample of drilling fluid and formation cuttings held in a bucket at the first washing position; stop means fixed in said drain at an unloading position cooperating with lugs carried by said bucket to unload the bucket of the formation cuttings remaining in the bucket after the drilling fluid is washed away; means at a second washing position for washing the bucket of any formation cuttings remaining after unloading at the unloading position; means for intermittently and simultaneously moving said buckets along said drain, whereby said buckets successively unload samples of formation cuttings carried by the drilling fluid; means for successively positioning empty containers beneath said unloading position to receive the samples of formation cuttings unloaded from said buckets; means synchronized with said means for moving said buckets for driving said container positioning means to position an empty container beneath said unloading position after the preceding container receives a sample; means for placing a lid on each filled container; and means for stamping each lid placed on a container with an index different than the index stamped on the preceding container.

5. A sampling device for use with a rotary drilling rig employing a drilling string and a circulating stream of drilling fluid comprising: a conduit for carrying drilling fluid mixed with formation cuttings for a well; said conduit having an opening for discharging a portion of the drilling fluid in said conduit, an annular horizontally disposed channel shaped drain having a portion thereof underlying said opening and defining a circular path; a plurality of foraminated buckets mounted for movement in one direction about said circular path, said buckets being spaced from each other along said path, each of said buckets being movable successively to a position beneath said opening to receive a sample of drilling fluid and formation cuttings discharged therethrough, a first water spray device in said path spaced from said opening for washing; said drilling fluid from the sample of drilling fluid and formation cuttings held in a bucket; means affixed in said path and cooperating with means on said bucket to unload the bucket of the formation cuttings remaining in the bucket after the drilling fluid is washed away; a second water spray device in said path and spaced from the bucket unloading means; for washing the buckets of any formation cuttings remaining after unloading; and means connected to said drilling string for moving each of said buckets along said path from one position to the next each time said drilling string descends a predetermined distance in a well.

6. A sampling device for use with a rotary drilling rig employing a drilling string and a circulating stream of drilling fluid comprising: a conduit for carrying drilling fluid mixed with formation cuttings from a well; said conduit having an opening for discharging a portion of the drilling fluid in said conduit, a drain having a portion underlying said opening; a plurality of buckets mounted for movement in one direction in said drain, said buckets being spaced from each other along said drain, each of said buckets being movable successively to a position beneath said opening to receive a sample of drilling fluid and formation cuttings discharged therethrough; water spraying means at a first washing position and disposed in confronting relationship above and below said drain to wash said drilling fluid from the sample of drilling fluid and formation cuttings held in a bucket at said first washing position; means in said drain at an unloading position cooperating with means on each bucket to invert and unload the bucket of the formation cuttings remaining in the bucket after the drilling fluid is washed away; water spraying means in said drain at a second washing position for washing the buckets of any formation cuttings remaining after unloading of the same; means connected to said drilling string for moving each of said buckets along said drain from one position to the next each time said drilling string descends a predetermined distance in a well; said last means comprising a main shaft connected to said drilling string for rotating said main string in accordance with the downward movement of said drilling string, a driven shaft, a spring connecting said shafts; and means for holding said driven shaft stationary until said main shaft is rotated a predetermined degree, said main shaft rotating against the resistance of said spring while said driven shaft is stationary, the stored energy in said spring rotating said driven shaft when said driven shaft is free to rotate.

7. A sampling device for use with a rotary drilling rig employing a drilling string and a circulating stream of drilling fluid comprising: a conduit for carrying drilling fluid mixed with formation cuttings from a well; said conduit having an opening for discharging a portion of the drilling fluid in said conduit, an annular drain; a plurality of buckets mounted for movement in one direction in said drain, said buckets being spaced from each other along said drain, each of said buckets being movable successively to a position beneath said opening to receive a sample of drilling fluid and formation cuttings discharged therethrough into said drain; a spray device at a first washing position to wash said drilling fluid from the sample of drilling fluid and formation cuttings held in a bucket at said first washing position; means fixed in said drain at an unloading position cooperating with means on said bucket to invert and unload the bucket of the formation cuttings remaining in the bucket after the drilling fluid is washed away; a spray device in said drain at a second washing position for washing the buckets of any formation cuttings remaining after unloading at an unloading position; means connected to said drilling string for moving each of said buckets along said drain from one position to the next each time said drilling string descends a predetermined distance in a well; said last means comprising a main shaft connected to said drilling string for rotating said main shaft in accordance with the downward movement of said drilling string, a driven shaft, a spring connecting said shafts, a latch for locking said driven shaft against movement, and cam carried by and rotating with said main shaft for actuating said latch to allow said driven shaft to rotate a predetermined degree each time said main shaft rotates a predetermined degree, said main shaft rotating against the resistance of said spring while said driven shaft is stationary, the stored energy in said spring rotating said driven shaft when said driven shaft is free to rotate.

8. A sampling device including: a driving shaft, a first shaft connected to said driving shaft for rotation therewith, a second shaft, a spring connecting said first and second shafts; a first disc rigid with said first shaft, a second disc secured to said second shaft above said first disc and having circumferentially spaced notches in its perimeter; a latch biased downwardly against said second disc and engageable selectively with said notches for holding said second shaft stationary while said first shaft rotates against the resistance of said spring; cam means spaced annularly about the perimeter of said first disc adapted to engage said latch and said first shaft for releasing said second shaft for limited rotation by the stored energy of said spring each time said first shaft rotates a predetermined degree; a conduit for conveying samples, an annular drain communicating with said conduit, a plurality of arms extending radially from the upper end of said second shaft and a sample receiving bucket mounted on the outer end of each of said arms for movement in said drain and adapted to be brought successively into a position to receive samples from said conduit.

9. A sampling device including: a driving shaft, a first shaft connected to said driving shaft for rotation therewith, a second shaft above and axially aligned with said first shaft, a spring connecting said first and second shafts; a first disc secured to said first shaft, a second disc secured to said second shaft intermediate its ends and having notches therein, a vertically reciprocable latch, having an extension spring, biased against said first disc, said latch being selectively engageable with the notches of said second disc to hold said second shaft stationary while said first shaft rotates against the resistance of said spring; cam means carried by said first disc and engageable with said latch extension for releasing said second shaft for limited rotation by the stored energy of said spring each time said first shaft rotates a predetermined degree; a sample conveying conduit having an opening, an annular channel shaped drain having a portion disposed below said opening, a plurality of radial arms carried by the upper end of said second shaft, a sample receiving bucket mounted on the outer end of each of said arms for successive movement to a sample receiving position in said drain to be filled with sample material through the opening in said conduit; said buckets being intermittently movable in said drain past a first washing position, an unloading position, and a second washing position.

References Cited in the file of this patent

UNITED STATES PATENTS

| | | |
|---|---|---|
| 1,362,968 | Stewart | Dec. 21, 1920 |
| 1,721,126 | Lilligren | July 16, 1929 |
| 2,020,194 | Kuhlmann | Nov. 5, 1935 |
| 2,214,674 | Hayward | Sept. 10, 1940 |
| 2,289,687 | Stuart | July 14, 1942 |
| 2,295,437 | Thompson | Sept. 8, 1942 |
| 2,322,478 | Scherbatskoy | June 22, 1943 |
| 2,324,516 | Kalin | July 20, 1943 |
| 2,342,273 | Hayward | Feb. 22, 1944 |
| 2,365,014 | Silverman et al. | Dec. 12, 1944 |
| 2,410,474 | Zeigler | Nov. 5, 1946 |
| 2,528,955 | Hayward | Nov. 7, 1950 |
| 2,570,155 | Redding | Oct. 2, 1951 |